United States Patent [19]

Gagnier et al.

[11] 4,123,624
[45] Oct. 31, 1978

[54] SWITCHING NETWORK FOR A PCM TDM SYSTEM

[75] Inventors: Real Gagnier, Hull; John B. Bourne, Ottawa; John B. Terry, Carp, all of Canada

[73] Assignee: Northern Telecom Limited, Montreal, Canada

[21] Appl. No.: 795,615

[22] Filed: May 10, 1977

[51] Int. Cl.² .................................................. H04J 3/00
[52] U.S. Cl. ................................................... 179/15 AT
[58] Field of Search ...................... 179/15 AT, 15 AQ

[56] References Cited

U.S. PATENT DOCUMENTS

| | | | |
|---|---|---|---|
| 3,705,266 | 12/1972 | Philip | 179/15 AT |
| 3,906,161 | 9/1975 | Schlichte | 179/15 AQ |
| 3,927,267 | 12/1975 | Voyer et al. | 179/15 AT |
| 3,970,794 | 7/1976 | Neufang | 179/15 AQ |

Primary Examiner—Thomas W. Brown
Attorney, Agent, or Firm—Frank Turpin

[57] ABSTRACT

A two-stage switching network is provided wherein the two stages are interconnected by a pseudo space switch. The input and output ports of the network, each comprising a plurality of channels, are partitioned into groups each one of which is common to a time division switch. Each switch comprises a serial-to-parallel or a parallel-to-serial converter circuit, a data memory and a connection memory. The space switch comprises a commutator circuit for sequentially and periodically connecting each of the input switches to each of the output switches once for each channel. The commutator comprises a plurality of layers corresponding in number to the number of bits in each PCM word.

11 Claims, 6 Drawing Figures

SWITCHING NETWORK FOR A PCM TDM SYSTEM

This invention relates to a switching system using pulse code modulation (PCM) and time division switching (TDM) and more particularly to a switching network module for such a system.

In the conventional telephone switching system, it is necessary to provide a switching network for interconnecting transmission paths between subscribers. In the more contemporary systems using PCM-TDM techniques, the switching networks have a space-time-space configuration or a time-space-time configuration with the latter being the more common. An example system using such a network is described in U.S. Pat. No. 3,851,105, issued Nov. 26, 1974 to Albert Regnier.

In the above-mentioned patent, a time-space-time configured switching network is described and the invention is directed at the space stage. In such a switching network, a plurality of input time switches each having a plurality of input ports are connected to a plurality of output time switches each having a plurality of output ports by means of a space switching stage. This space switching stage or space switch provides the links between the input and output time division switches and usually comprises a large number of crosspoints controlled by connection memories and complex switching circuitry.

In a two-stage switching network each having eight switches and each switch having eight inputs and eight outputs, the outputs of the switches in the first stage must be connected to the inputs of the switches in the second stage. Therefore, sixty-four interconnections or links between the stages are necessary. In a system wherein each port handles thirty-two voice channels each having ten bits, each link requires ten leads if the data is to be transferred in parallel format between stages. Hence, to connect the input stage to the output stage requires sixty-four links and 640 leads to be switched in the space stage. This signifies that the input and output time switching stages must be connected to the space switching stage by cables of 640 leads. Due to their large number, these leads cannot be printed on a backpanel printed circuit board and create the necessity of providing 1280 connector pins for each cable. This cabling creates a reliability problem and makes packaging difficult. Therefore, in the known art, the space switching stage necessary to the parallel interconnection of the time switching stages of a two-stage network is complex and costly as well as being relatively bulky.

In the prior art, it is also known to interconnect two time switching stages using serial data transmission therebetween. This technique requires that the data in the first stage be converted to serial format and reconverted to parallel format in the second stage. This method requires the use of high speed data handling techniques which translate into expensive hardware and reduced reliability.

The invention provides a space switching stage whose purpose it is to alleviate these problems. In accordance with the invention, there is provided a pseudo space switching stage which may be incorporated as a part of either the input or the output time switching stages. The space stage is a commutator circuit, including a counter circuit, for sequentially and periodically connecting each of the switches in the input stage to each of the switches in the output stage whereby each of the input stage time switches is connected to a respective one of the output time switches at any one time. This arrangement obviates the need for a switching matrix and connection memories as well as the high speed data handling techniques and associated circuitry of the serial transfer method.

In accordance with the invention, only one eighty-lead bus is required to interconnect the input time stage to the output time stage in the example switching network described above. This bus can readily be incorporated as part of the printed wiring on a backplane printed circuit board for the shelf occupied by the printed circuit boards of the switching network.

In addition to the hardware advantages of the invention, the use of a commutator circuit allows the link pattern between the input and output time switches to be changed to accommodate smaller link patterns that may be required in an office smaller than the maximum capacity with only very minor wiring changes. For the same reason, it permits a very small incremental increase in network capacity for an existing office.

A more complete understanding of the present invention and its various features and advantages may be obtained upon the consideration of the following detailed description of an example embodiment thereof in conjunction with the attached drawings in which:

FIG. 3b is a block schematic diagram of an input time switch of the switching network of FIG. 3a;

Figure 1:
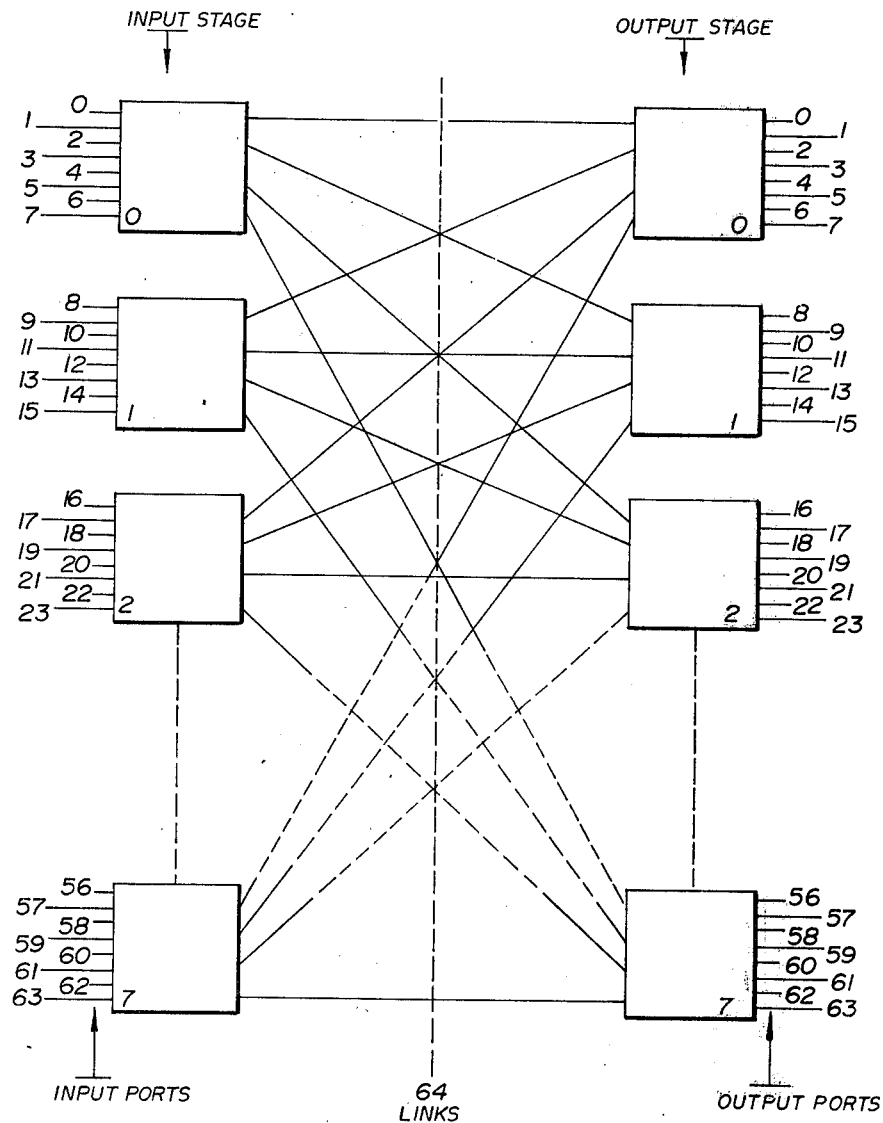
FIG. 1 is a block diagram of a switching network module.

FIG. 1 illustrates the configuration of a switching network required to establish communication paths between a plurality of input ports and a plurality of output ports. The network comprises an input stage having a plurality of input time switches and an output stage also having a plurality of time switches equal in number to that of the input stage. In order to ensure full connectivity, each of the input switches must be connected to all of the output switches. These connections are conventionally achieved in a space switching stage and are represented in FIG. 1 by the connections shown as the 64 links.

By way of example, FIG. 1 includes 64 input ports 0-63 partitioned into eight groups (0-7) of eight ports, each port including 32 channels. In such a case, the number of elementary network time slots is 256. Each channel corresponds to one conversation and carries PCM words of ten bits apiece. Thus, each of the 64 links is required to have ten leads and a prior art space switching stage necessary to realize the 64 links would be connected to the input and output stages via a pair of 640 lead cables. Alternatively, the data may be transferred serially between the input and output stages of the network.

Figure 2:
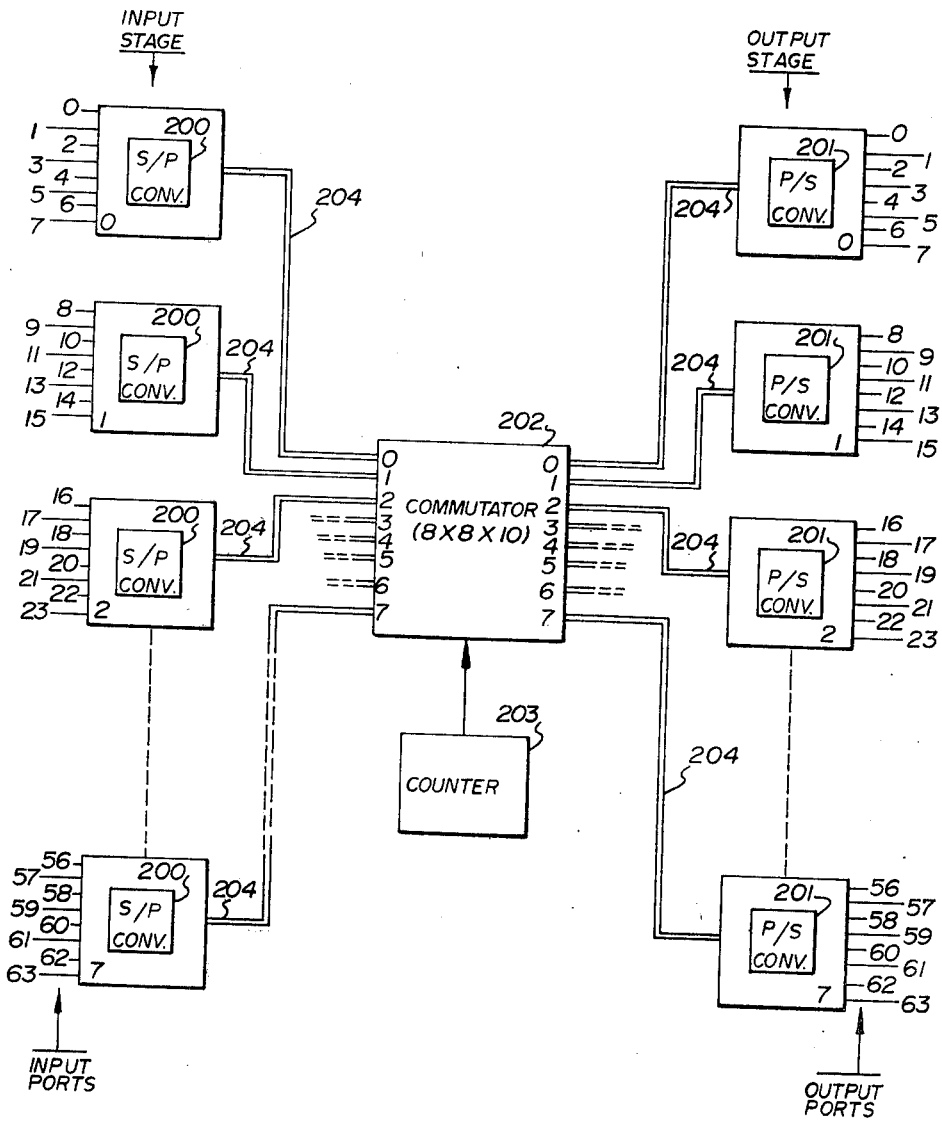
FIG. 2 is a block diagram of a system showing a switching network illustrating the concept of a pseudo space switching stage in accordance with the invention.

FIG. 2 is a block diagram of a switching network illustrating the concept of a pseudo space switching stage in accordance with the invention. Each of the input time switches 0-7 of the input stage includes a serial-to-parallel converter circuit 200 for converting the serial data appearing on input ports 0-63 to parallel format. Similarly, each of the output time switches 0-7 of the output stage includes a parallel-to-serial converter circuit 201 for converting the parallel data from the space stage to serial format for transmission via the output ports 0-63. The 64 links of FIG. 1 are realized by a pseudo space switching stage comprising a commutator circuit 202 and a counter 203. The commutator circuit 202 is connected to each of the input and output time switches by respective ten-lead cables 204. Thus, the space stage is connected to the input and output stages via a pair of 80-lead cables. The commutator circuit 202 comprises ten parallel layers or planes each having an 8 × 8 crosspoint configuration whereas the counter circuit is a three-stage counter supplying eight counts to the commutator circuit 202. By offsetting the crosspoint wiring by one for each column of the commutator circuit 202 and advancing the counter one count for each column, each of the input time switches 0-7 is connected to each of the output time switches 0-7 once for each full cycle of the counter, thereby providing the 64 links as required and shown in FIG. 1. If one count from the counter circuit 203 represents one time slot then the space switch commutates one frame of data during a period of 256 time slots which is the elementary time slot number for a switching network of this configuration.

Figure 3A:
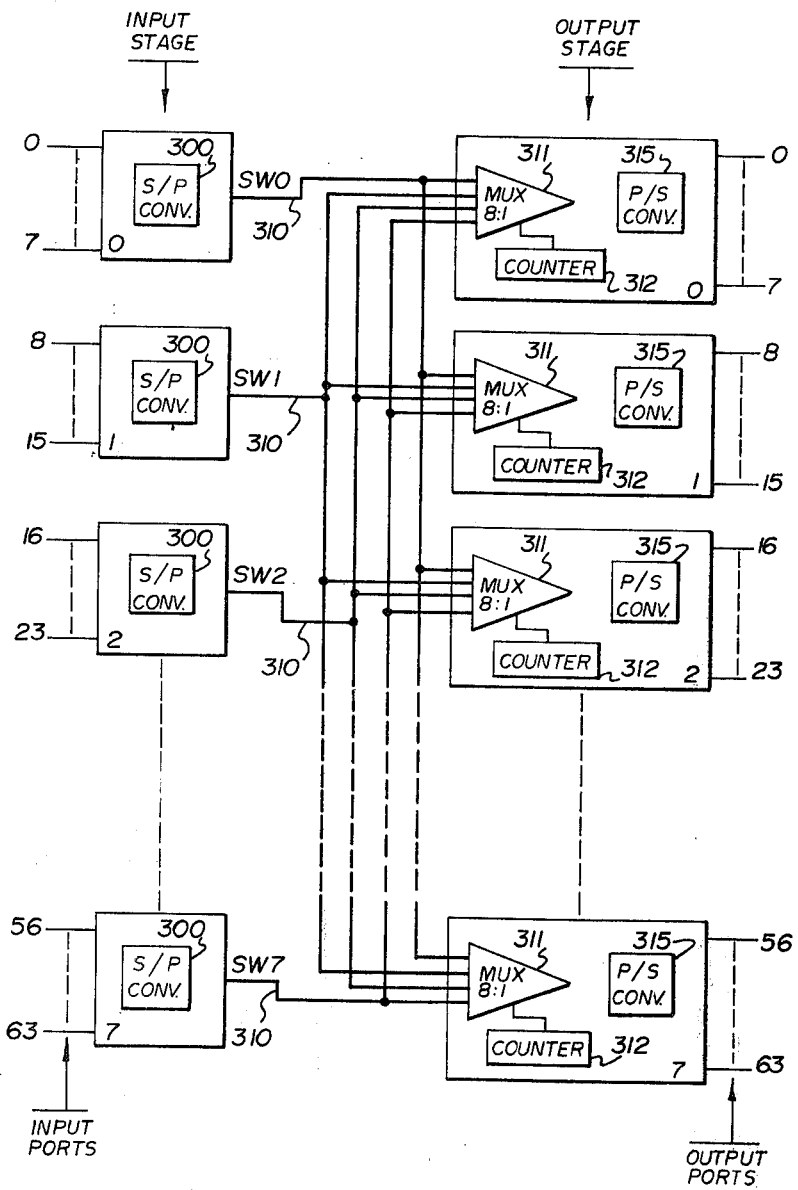
FIG. 3a is a block schematic diagram illustrating a switching network in accordance with the invention.
Figure 3B:
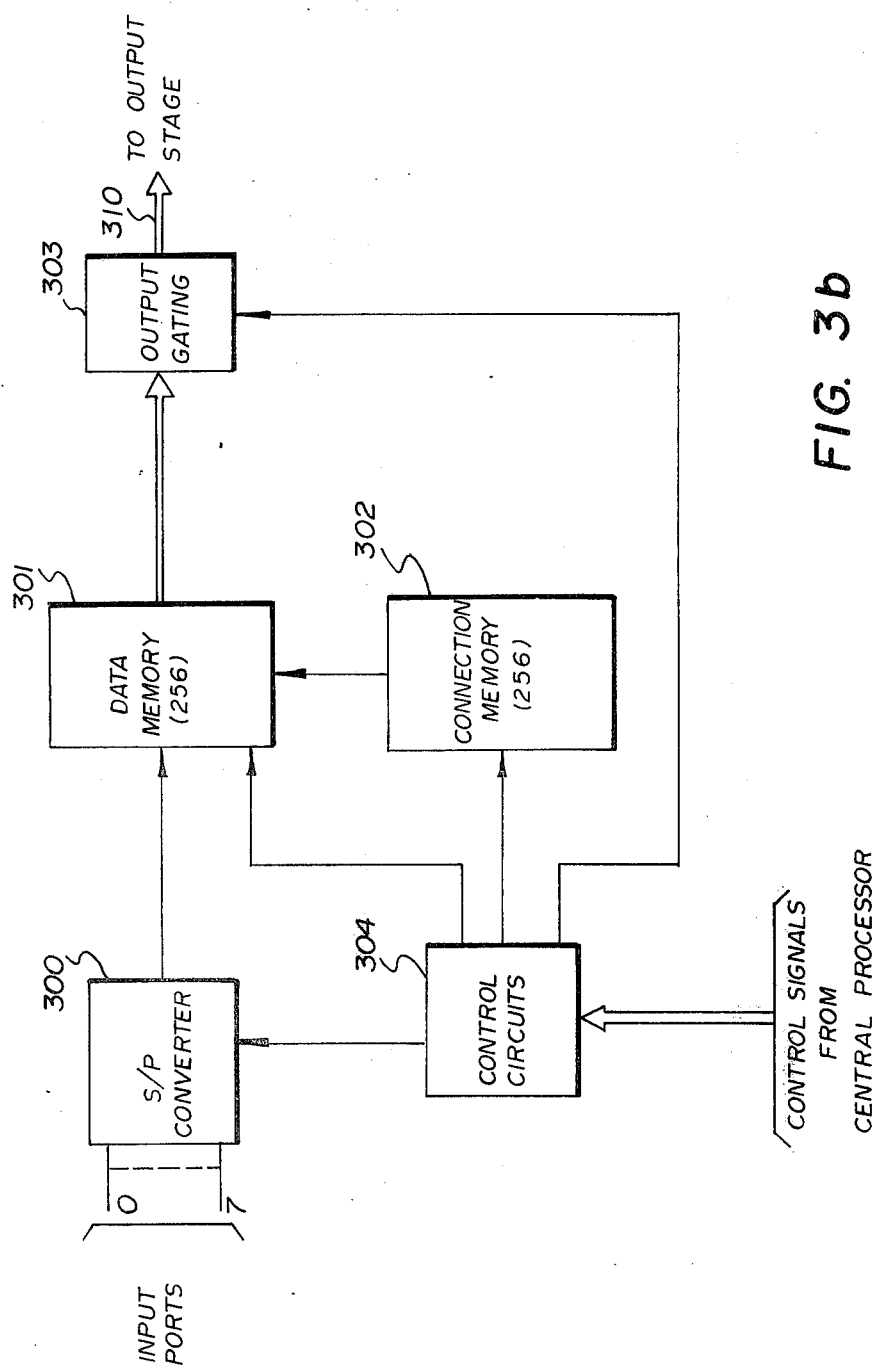
Figure 3C:
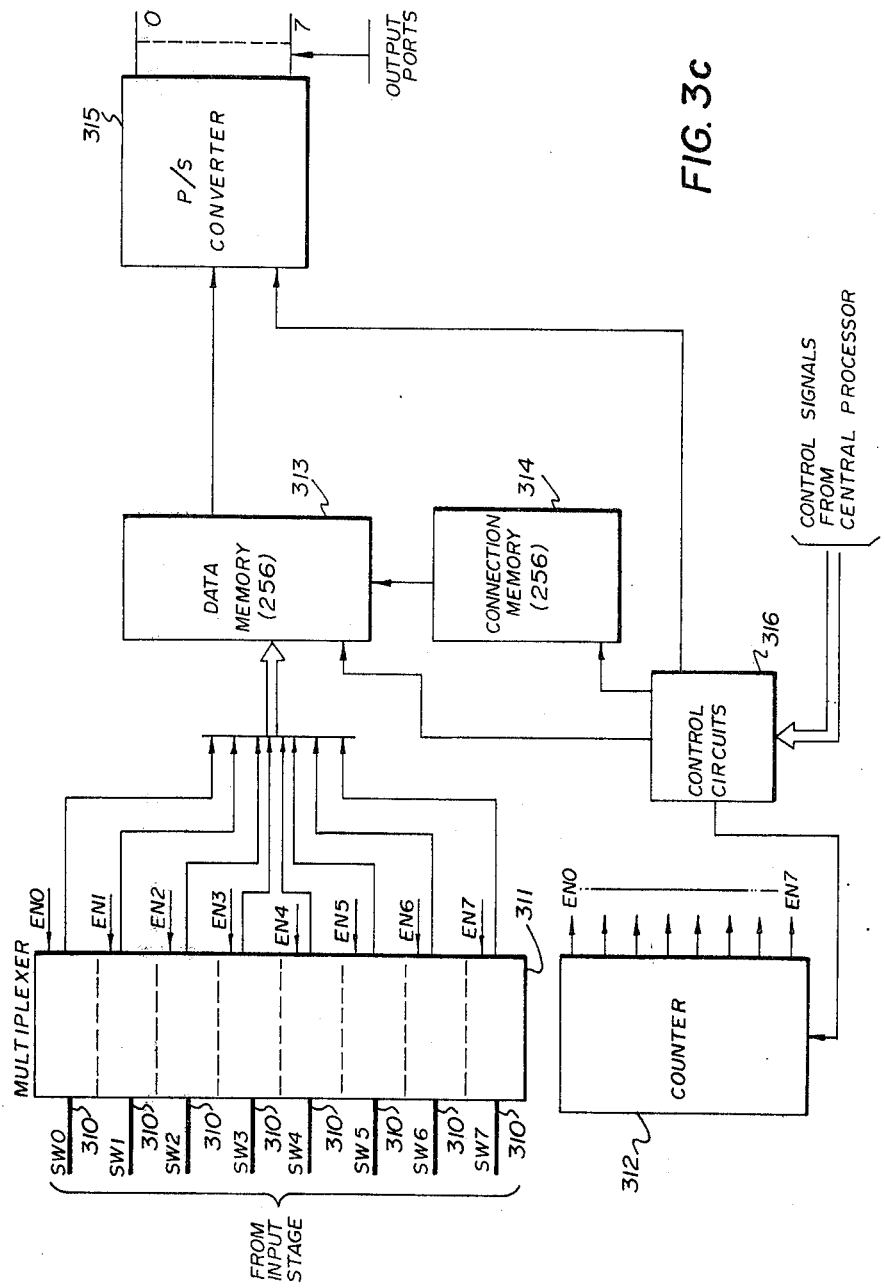
FIG. 3c is a block schematic diagram of an output time switch of the switching network of FIG. 3.

FIGS. 3a-3c illustrate a practical example embodiment of the switching network of FIG. 2. The space switching stage is distributed and fully integrated in the time switches of the output stage.

The input ports 0-63 to the network are partitioned into eight groups and each group is connected to a respective one of time switches 0-7.

As shown in FIG. 3b, each input switch is a full access unidirectional time switch which accepts serially formatted data and produces time-switched data in parallel format. Each time switch includes a serial-to-parallel converter circuit 300, a data memory 301, a connection memory 302, output gating 303 and control circuits 304. The converter circuit 300 accepts serial data from eight ports simultaneously during one channel and outputs the data during the next channel as eight words, ten bits wide. It operates continuously by means of a dual-rank shift register arrangement; one stage is inputting while the other is outputting. At channel boundaries the eighty bits of data collected by the first stage are transferred en masse to the second stage. These converter circuits are well known in the art and are available commercially. For example, a suitable converter circuit is described in U.S. Pat. No. 3,778,773 issued to D. F. Hood and assigned to applicants' assignee.

The data memory 301 stores speech data in parallel from — ten bits wide. Data from each incoming channel and port is stored in a unique location at the address corresponding thereto. The memory has a capacity of 256 words and is operated with one read and one write cycle per bit time. The data from the converter circuit 300 is written into sequential locations of the memory 301 which is addressed by a counter which is not shown as such but is understood to be part of the control circuits 304.

The connection memory 302 also has a capacity for 256 words, one location for each output stage time switch and each channel therein. Each location contains the connection information for the output stage time switch and channel that it represents. Connection memory read operations are performed sequentially in the order of output stage time switch and channel, and for each connection memory read, one data memory access occurs which transfers data to the buses 310 via the output gating 303. The resulting 10-bit parallel data stream which is sent to bus 310 is time-divided into 32 channels and within each channel are eight time slots, one for each of the eight output stage time switches. The timing of the data stream is such that the data from a given input stage time switch to a given output stage time switch is available on the bus at the time that the output stage time switch looks at the bus 310. The time switching function occurs when the data is randomly read out of the data memory 301, under control of the connection memory 302, and sent to the bus 310.

The timing and gating signals as well as the address generation signals for the memories are generated by control circuits 304 under the control of signals from the central processor (not shown) of the switching system. The above-described time switches are relatively conventional and will not be described further.

As shown in FIG. 3a, the buses 310 are each connected to a respective input of each of the time switches 0-7 of the output stage. In fact, each bus 310 is connected to a respective input of a commutator multiplexer 311 in each time switch. Each multiplexer 311 is controlled by enable signals from a respective counter 312.

FIG. 3c is a block schematic diagram of one of the output stage time switches shown in FIG. 3a. It shows a data memory 313, a connection memory 314, a parallel-to-serial converter circuit 315, control circuits 316, as well as a multiplexer 311 and counter 312. The memories 313 and 314, converter circuit 315 and control circuits 316 are similar in size and function to the equivalent circuits described above in relation to the input stage time switches.

The counter 312 is a three-stage circuit which is adapted to be jamset to start counting at any count and to cycle periodically thereafter. These are available commercially as off-the-shelf components as are the multiplexers 311. The counter 312 generates eight enable signals (EN0-EN7) sequentially, and these signals control the operation of respective stages of the multiplexer 311. Respective inputs to the eight stages of the multiplexer 311 are connected to respective ones of buses 310 whereas the outputs of the multiplexer 311 are bussed to the data input of the data memory 313. It may be noted that since each bus 310 carries ten bits in parallel, each stage of the multiplexer 311 is also ten bits wide.

Figure 4:
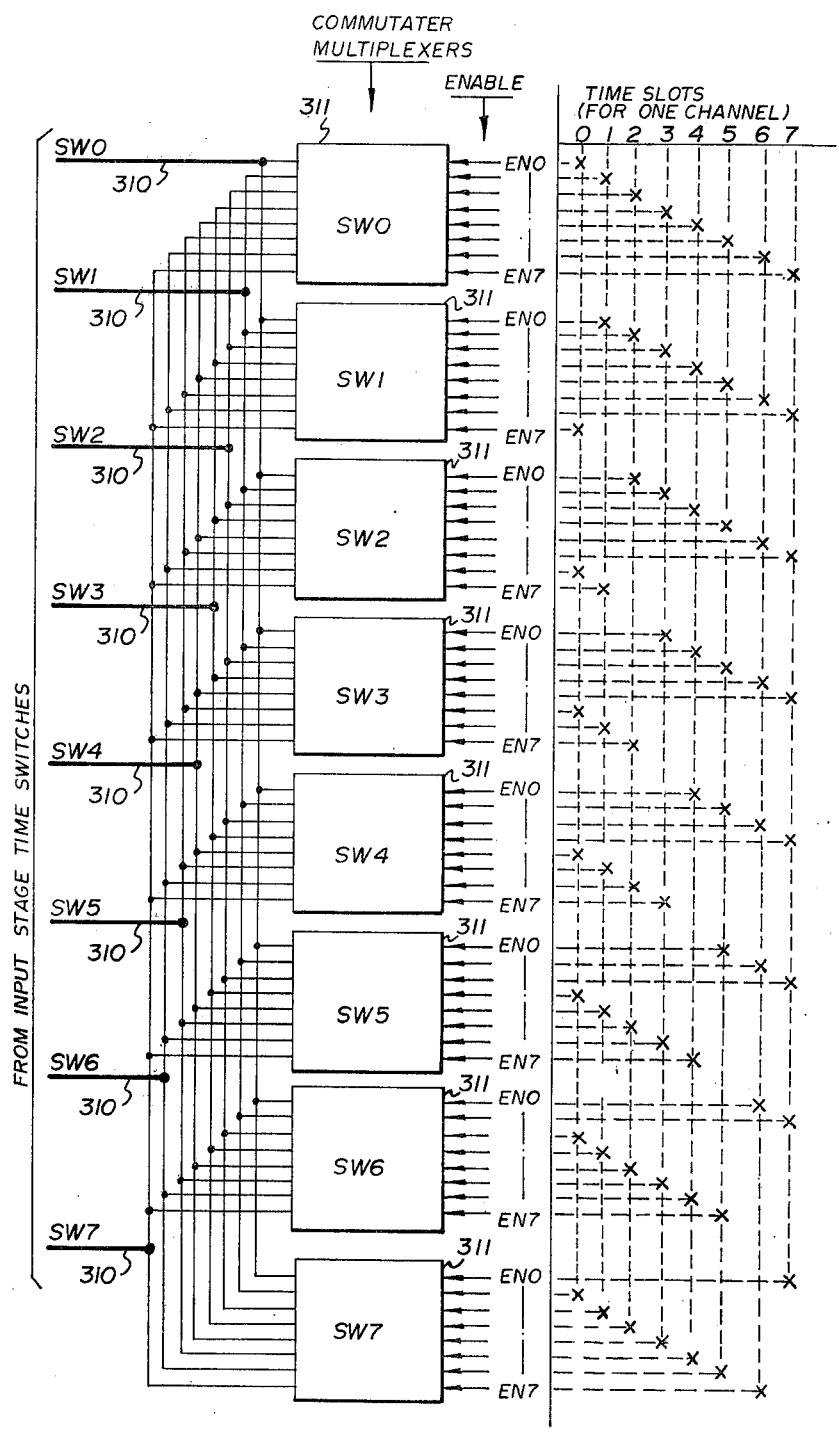
FIG. 4 is a partial diagram of the output stage of FIG. 3, illustrating the control and timing of the commutator circuit.

FIG. 4 is a partial block diagram of the output stage of the switching network showing the timing of the counters 312 and multiplexers 311 to achieve the commutating function. Each counter 312 of the output stage time switches 0-7 is jamset to start counting at a count number offset by one count from the counter in the time switch previous to it. Also, each of the buses 310 is connected to respective inputs of multiplexers 311 of each of the switches 0-7. Therefore, for any one count or time slot generated by the counters 312 each multiplexer 311 allows the data from a different one of buses 310 to be written into its associated data memory 313. The "X"s on the diagram of FIG. 4 indicate the time slots during which the different stages of multiplexers 311 are enabled during one channel. Since eight time slots are required to commutate the data for one channel from the input stage to the output stage, the data for thirty-two channels is commutated during 256 time slots. Therefore, the commutator circuitry provides a total of 2048 speech paths (64 links, 32 channels) per frame between the input and output stages of the network.

Brief Description of Operation

Serial PCM signals appearing on the input ports 0-63, are converted to parallel format by the serial-to-parallel converter circuits 300 as described above. They are then sequentially written into respective data memories 301 from which they are read out randomly under control of respective connection memories 302 and sent unto the buses 310 (10 bits wide). The sequential write, random read functions provide the time switching.

All of the ten-bit buses 310 from the first stage time switches 0-7 are connected to each of the second stage time switches 0-7. These buses enter each output stage time switch via ten 8-input multiplexers 311 whose enable lines are controlled by the signals from the counter 312.

The bus 310 from each input stage time switch is time-divided into 32 channels, each of which is further sub-divided into 8 time slots, one for each output stage time switch. The boundaries of the time slots on bus 310 from one input stage time switch are synchronized with respect to the time slot boundaries of the buses 310 from all the other input stage time switches. The assignment of the time slots however, differs from bus to bus in an organized fashion, as shown in FIG. 4.

During one time slot, each input stage time switch outputs one word on its respective bus. Thus, during one time-slot, eight words, one from each input stage time switch are present at the bus input to every output stage time switch and each output stage time switch looks at one bus. During that one time slot, each of the eight output stage time switches is looking at a different bus; thus there are eight distinct paths in existence. The same process is repeated for the next seven time slots in the channel, thus providing the 64 paths required to connect every input stage time switch to every output stage time switch once for every channel time. This predetermined pattern of 64 paths is repeated continuously at the rate of 32 times during a frame time thereby making the pattern time invariant hence independent of the level and pattern of the traffic being carried by the network.

The bus selection at the output stage time switches is performed by the multiplexer 311 under control of the enable signals from the counters 312 as described above. The parallel data appearing at the output of the commutator multiplexers 311 is written sequentially into the data memories 313. The data memories are read randomly under the control of their respective connection memories 314 and the resulting parallel streams of data are fed to respective parallel-to-serial converter circuits 315 which convert the parallel data to serial format for transmission on the output ports 0-63.

One of the reasons that a switching network is partitioned in blocks or modules is to provide modularity, thereby enhancing the packages flexibility which of course translates into cost savings. For example, the switching network module shown in FIGS. 1 through 3 represent the hardware which can be placed on printed circuit cards occupying one shelf space of an equipment frame. For obvious reasons of economy related to maintenance and inventory, it is desirable to provide each input stage time switch and each output stage time switch on a respective single card. By using the network circuit configuration of FIG. 3, the interconnections between the input and the output switches are greatly simplified. The required 80-lead bus (8 ten-lead buses 310) may simply be printed on the backplane printed circuit card of the shelf thereby obviating the need for connectors and cabling, thus realizing important savings of materials and labour with the added bonus of reliability.

In addition to solving the problems discussed earlier such as the elimination of crisscross wiring and cabling, reducing wiring without converting to serial format and vice-versa, the commutator circuit of the invention allows the link pattern to be changed to accommodate smaller patterns that may be required in small switching offices, with very minor changes. For example, if a 32 input-output switching network is required, the counters that drive the commutator multiplexers are arranged to reset after four counts instead of eight counts.

Therefore, the invention provides a switching network module which is flexible, economical, and exhibits improved reliability characteristics over the known art. It should also be realized that it is entirely possible to reconfigure the switching network illustrated herein without departing from the scope and spirit of the invention. For example, a similar switching network may be designed wherein the commutator circuit is located in a place other than in the output stage time switches of the network.

What is claimed is:

1. A switching network for a time division multiplex system comprising:
   a plurality of incoming time division switches, each switch having $n$ incoming data ports each having $m$ channels;
   means associated with each of said incoming time division switches for converting the information on said data ports from serial to parallel format and memory means for storing said data in parallel form, the memory means having $nm$ storage locations;
   a plurality of outgoing time division switches, each switch having $n$ outgoing data ports and comprising $m$ channels;
   memory means associated with each of said outgoing switches for storing incoming data to the switch and means for converting this data to serial format; and
   commutator means for periodically connecting each of said input time division switches to each of said output time division switches in a predetermined interconnection pattern which is independent of the level and pattern of the traffic being carried by the network, said commutator means comprising means for continuously generating predetermined $m$ sequences of $n$ time slots such that each incoming time switch is connected to each outgoing time switch once for the duration of one time slot during each of said sequences.

2. A time division multiplex switching network for interconnecting a plurality of input ports to a corresponding number of output ports, the input and output ports being partitioned into $x$ groups each comprising $n$ ports each having $m$ channels, the network comprising:
   an input stage comprising $x$ time switches each comprising a serial-to-parallel data converter circuit for converting the serial data appearing on its input ports to parallel format, an input data memory having $nm$ locations for storing the data from the converter circuit, and a connection memory also having $nm$ locations;

an output stage comprising $x$ time switches each comprising an output data memory for storing $nm$ words of data, a connection memory also having $nm$ locations, and a parallel-to-serial converter circuit for converting the data from the output data memory to serial format; and a commutating circuit for continually and periodically connecting each of said input stage time switches to each of the output stage time switches once every $n$ elementary network time slots such that each of the input stage time switches is connected to each of the output stage time switches $m$ times during $nm$ elementary network time slots, whereby the interconnection pattern between the input stage and the output stage is independent of the level and pattern of the traffic being carried by the network.

3. A switching network as defined in claim 2 wherein the commutating circuit comprises:

a plurality of groups of transmission gates, each one of said groups being associated with a respective one of the time switches of the output stage and each group providing $x$ gated transmission paths, one from each of the input stage time switches, to the data input of the output data memory associated with the group; and means for sequentially and periodically enabling each of said transmission paths, the enabling of corresponding paths of the groups being non-coincidental.

4. A switching network as defined in claim 3 wherein the enabling means comprises a plurality of x-count periodic counters, one for each of said groups of transmission gates, each of the counters providing enable pulses which are staggered by one count relative the enable pulses from the counter associated with the output stage time switch preceding it.

5. A time division multiplex switching network for interconnecting a plurality of input ports to a corresponding number of output ports, the input and output ports being partitioned into $x$ groups each consisting of $n$ ports each having $m$ channels, the network comprising:

$x$ time division input switches each comprising a serial-to-parallel data converter, a data memory for sotring $nm$ words of data and a connection memory;

$x$ time division output switches each comprising a data memory for storing $nm$ words of data, a connection memory, and a parallel-to-serial data converter; and circuit means for continually and periodically connecting each of said input switches to each of said output switches once every $n$ elementary network time slots, each of the input switches being connected to each of the output switches $m$ times during $nm$ elementary network time slots whereby the interconnection pattern between the input time switches and the output time switches is independent of the level and pattern of the traffic being carried by the network.

6. A switching network as defined in claim 5 wherein said circuit means comprises:

a plurality of multiplexers, each one being associated with a respective output time switch, and each multiplexer having $x$ input ports each one being respectively connected to one of the input switches; and means for sequentially enabling each of the multiplexer input ports, the enabling sequence for a multiplexer being offset by one position from that of the preceding multiplexer.

7. A switching network as defined in claim 6 wherein said enabling means comprises a plurality of counters, each one being associated with a respective multiplexer for providing thereto an enabling sequence of x-pulses, the enabling sequence from any one counter being offset from that of the preceding counter by one pulse.

8. In a time division multiplex system comprising a switching network having an input stage and an output stage, each of the stages having a corresponding plurality of time switches, each of the time switches comprising a data memory for storing data words in parallel and an associated connection memory, a circuit for connecting the input stage to the output stage comprising, a commutator circuit for sequentially and periodically connecting each of the switches in the input stage to each of the switches in the output stage in a predetermined time invariant pattern such that each of the input stage time switches is connected to a respective one of the output stage time switches at any one time.

9. In a system as defined in claim 8, the commutator circuit comprising, a plurality of multiplexers, each one being associated with a respective output time switch and each multiplexer having a plurality of input ports each one being connected to a respective one of the input time switches, and means for sequentially enabling each of the multiplexer input ports, the enabling sequence for a multiplexer being offset by one position from that of the multiplexer in the preceding time switch.

10. In a system as defined in claim 9, the enabling means comprising a plurality of counters, each one being associated with a respective multiplexer for providing thereto an enabling sequence of pulses corresponding in number to the plurality of input time switches, the enabling sequences from the counters being non-coincidental.

11. In a switching network for a time division multiplex system, the network comprising an input time switching stage and an output time switching stage, each of said stages having a corresponding plurality of time switches, a method of interconnecting said input stage to the output stage comprising the steps of:

converting the data appearing at the input ports of the input time switches to parallel format, commutating in parallel format, the data from each input time switch to each of the output time switches such that each of the input time switches is connected to one of the output time switches during any one elementary network time slot and after one channel time, each of the input time switches has been connected to every one of the output time switches, whereby for every frame of data appearing at the input ports of the input time switches, each of the input time switches are connected to each of the output time switches a number of time slot periods corresponding to the number of channels in every frame, the pattern of interconnection between the input time switches and the output time switches being independent of the level and pattern of traffic being carried by the network; and converting the commutated parallel data into serial format for transmission on the output ports of the output time switches.

* * * * *